United States Patent
Simeral et al.

(10) Patent No.: US 8,239,938 B2
(45) Date of Patent: Aug. 7, 2012

(54) CENTRALIZED DEVICE VIRTUALIZATION LAYER FOR HETEROGENEOUS PROCESSING UNITS

(75) Inventors: Brad W. Simeral, San Francisco, CA (US); Michael Brian Cox, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 911 days.

(21) Appl. No.: 12/330,466

(22) Filed: Dec. 8, 2008

(65) Prior Publication Data

US 2010/0146620 A1  Jun. 10, 2010

(51) Int. Cl.
*G06F 12/00* (2006.01)
*G06F 12/14* (2006.01)
*G06F 13/00* (2006.01)

(52) U.S. Cl. .......................... 726/21; 726/26
(58) Field of Classification Search .............. 726/21, 726/26
See application file for complete search history.

(56) References Cited

U.S. PATENT DOCUMENTS

| | | | | |
|---|---|---|---|---|
| 7,783,779 | B1 * | 8/2010 | Scales et al. ................ | 709/240 |
| 2003/0188122 | A1 * | 10/2003 | Bennett et al. .............. | 711/202 |
| 2004/0064668 | A1 * | 4/2004 | Kjos et al. .................. | 711/202 |
| 2004/0111552 | A1 * | 6/2004 | Arimilli et al. ............. | 711/100 |
| 2006/0005003 | A1 * | 1/2006 | Grobman ..................... | 713/2 |
| 2006/0005189 | A1 * | 1/2006 | Vega et al. .................. | 718/1 |
| 2006/0026383 | A1 * | 2/2006 | Dinechin et al. ............ | 711/207 |

FOREIGN PATENT DOCUMENTS

WO 2007115425 10/2007

OTHER PUBLICATIONS

KIPO Office Action, KR Appl. No. 10-2009-121399, mailed Feb. 24, 2011.

* cited by examiner

*Primary Examiner* — William Powers
(74) *Attorney, Agent, or Firm* — Patterson & Sheridan, LLP

(57) ABSTRACT

A method for providing an operating system access to devices, including enumerating hardware devices and virtualized devices, where resources associated with a first hardware device are divided into guest physical resources creating a software virtualized device, and multiple instances of resources associated with a second hardware device are advertised thereby creating a hardware virtualized device. First and second permission lists are generated that specify which operating systems are permitted to access the software virtualized device and the hardware virtualized device, respectively. First and second sets of virtual address maps are generated, where each set maps an address space associated with either the software virtualized device or the hardware virtualized device into an address space associated with each operating system included in the corresponding permission list. The method further includes arbitrating access requests from each of the plurality of operating systems based on the permission lists and the virtual address maps.

20 Claims, 9 Drawing Sheets

CENTRALIZED DEVICE VIRTUALIZATION LAYER FOR HETEROGENEOUS PROCESSING UNITS

BACKGROUND OF THE INVENTION

1. Field of the Invention

The present invention relates generally to the field of device virtualization and, more specifically, to a centralized device virtualization layer for heterogeneous processing units.

2. Description of the Related Art

In a conventional computer system, a central processing unit (CPU) is capable of executing multiple operating systems (OSs). A software program known as a "hypervisor" is often used to coordinate the operations of the different OSs. The hypervisor manages input/output (I/O) access operations (accesses) transmitted from each OS to various hardware devices included in the computer system. These hardware devices may include memory modules, computer monitors, hard disk drives, and CD-ROM drives, among others. The hypervisor allows each of the OSs to access the hardware devices using a technique known as "device virtualization," which may be used to create virtual instances of a hardware device. A hardware device may be virtualized via "software virtualization" and/or "hardware virtualization."

When software (SW) virtualization is implemented, the hypervisor divides the resources of a hardware device into multiple "guest physical resources." Each guest physical resource may then be assigned to a particular OS. The hypervisor advertises the guest physical resources to the OSs so that when an OS attempts to access the guest physical resources associated with a hardware device, the hypervisor may trap the access to ensure that the correct context is loaded on the hardware device before allowing that OS to access the hardware device.

When hardware (HW) virtualization is implemented, each hardware device advertises multiple instances of that HW device so that each instance is allocated the full amount of resources made available by the hardware device. Each OS is then assigned one of those instances. The hypervisor acts as an arbiter between the OSs by determining which OS may access a particular virtualized device. Since HW virtualization is implemented in hardware, the hypervisor may not be aware that a particular physical resource is being virtualized. Each HW virtualized device recognizes conflicts with other virtualized devices and resolves these conflicts (e.g., by restoring contexts or quiescing one or more of the virtualized instances of that device) before taking action on the physical resource.

SW virtualization and HW virtualization work well when a single processor executes multiple OSs on top of a single hypervisor. However, more diverse processor topologies that include multiple CPUs executing multiple OSs are less amenable to SW virtualization and/or HW virtualization. For example, a multi-CPU computer system may include several CPUs that are each connected to the same group of hardware devices. Some hardware devices cannot be virtualized in hardware or in software, thus, the computer system includes only one resource for that hardware device that cannot be shared by two CPUs. Implementing SW virtualization in a multi-CPU computer system is also problematic because bottlenecks can be created when an OS wants to access a SW virtualized hardware device that is being underutilized. Since the resources of the hardware devices are divided into guest physical resources, each OS can only utilize a portion of the total resources of the hardware device. When only one OS is attempting to access the hardware device, that OS may require more resources than are allocated by the guest physical resource. A resource bottleneck is created because resources of the hardware device are still available, but the OS cannot utilize these resources because they have been allocated to other guest physical resources.

Implementing HW virtualization in a multi-CPU computer system is also problematic because a virtualized device would need to be created for each OS running on each CPU. Implementing HW virtualization for each hardware device would significantly increase the resources advertised within the computer system and would force each hardware device to be virtualized for each OS, even though a particular OS may not need to utilize the resources provided by a particular hardware device.

Accordingly, there remains a need in the art for an improved technique for virtualizing hardware devices in a multi-CPU computer system.

SUMMARY OF THE INVENTION

Embodiments of the invention provide a method for providing an operating system access to hardware devices included in a computer system. The method includes: enumerating one or more hardware devices and one or more virtualized devices included in the computer system, including determining that resources associated with a first hardware device are divided into guest physical resources thereby creating a software (SW) virtualized device, and determining that multiple instances of resources associated with a second hardware device are advertised by the second hardware device thereby creating a hardware (HW) virtualized device; generating a first permission list that specifies which operating systems in a plurality of operating systems are permitted to access the SW virtualized device; generating a second permission list that specifies which operating systems in the plurality of operating systems are permitted to access the HW virtualized device; generating a first set of virtual address maps that each map a first address space associated with the SW virtualized device into an address space associated with each operating system included in the first permission list; generating a second set of virtual address maps that each map a second address space associated with the HW virtualized device into an address space associated with each operating system included in the second permission list; and arbitrating access requests from each of the plurality of operating systems, including allowing the operating systems included in the first permission list to perform access operations using the SW virtualized device based on the first set of virtual address maps, and allowing the operating systems included in the second permission list to perform access operations using the HW virtualized device based on the second set of virtual address maps.

Advantageously, embodiments of the invention extend device virtualization to computing systems that include multiple CPUs. The CDVL allows OSs executing on each CPU to access a common pool of enumerated devices that are coupled to the computing system. The CDVL may be used in conjunction with SW virtualization and HW virtualization to provide dedicated virtualization support to an OS that requires such support.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
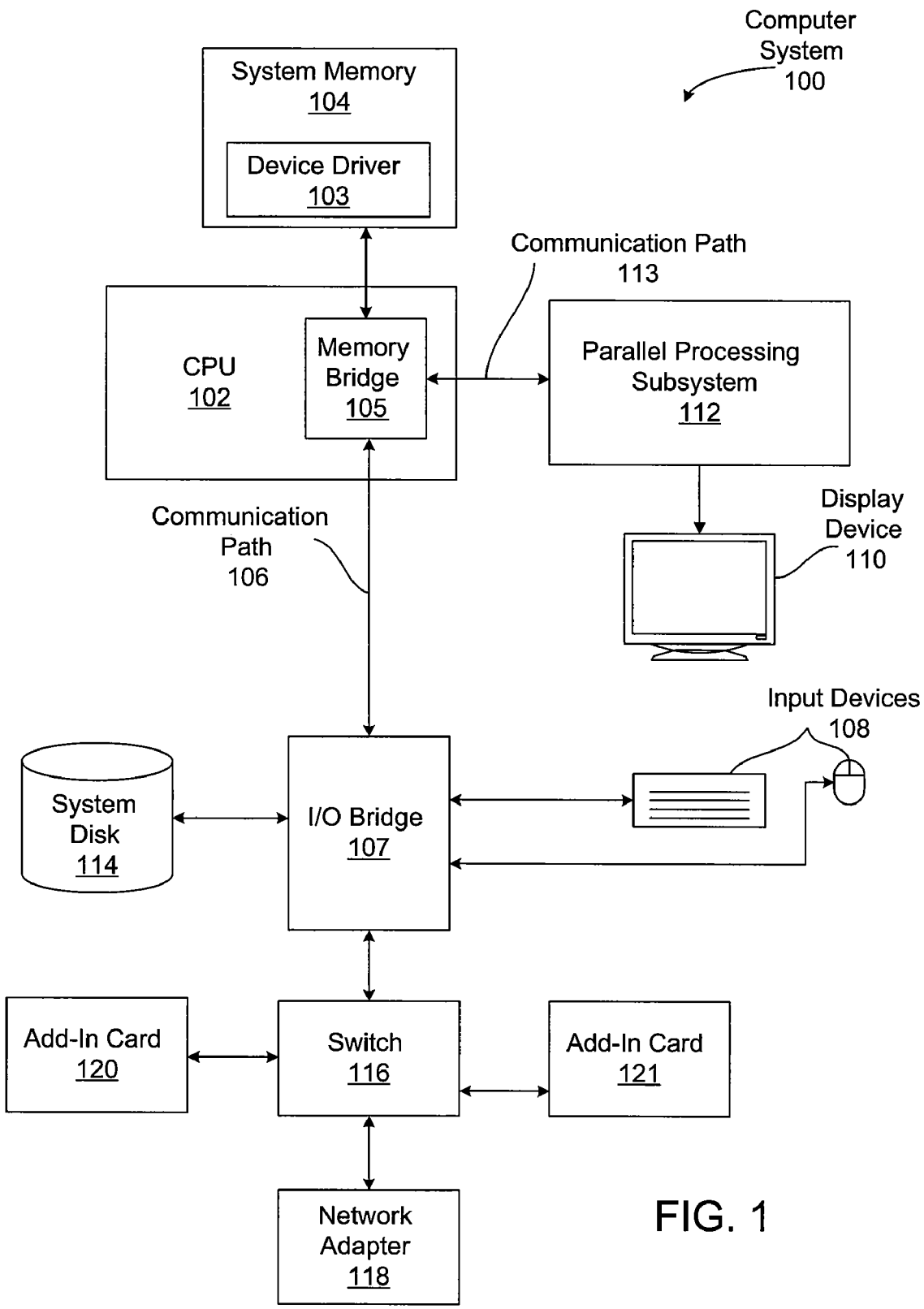
FIG. 1 is a block diagram illustrating a computer system configured to implement one or more aspects of the invention.

FIG. 1 is a block diagram illustrating a computer system 100 configured to implement one or more aspects of the invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
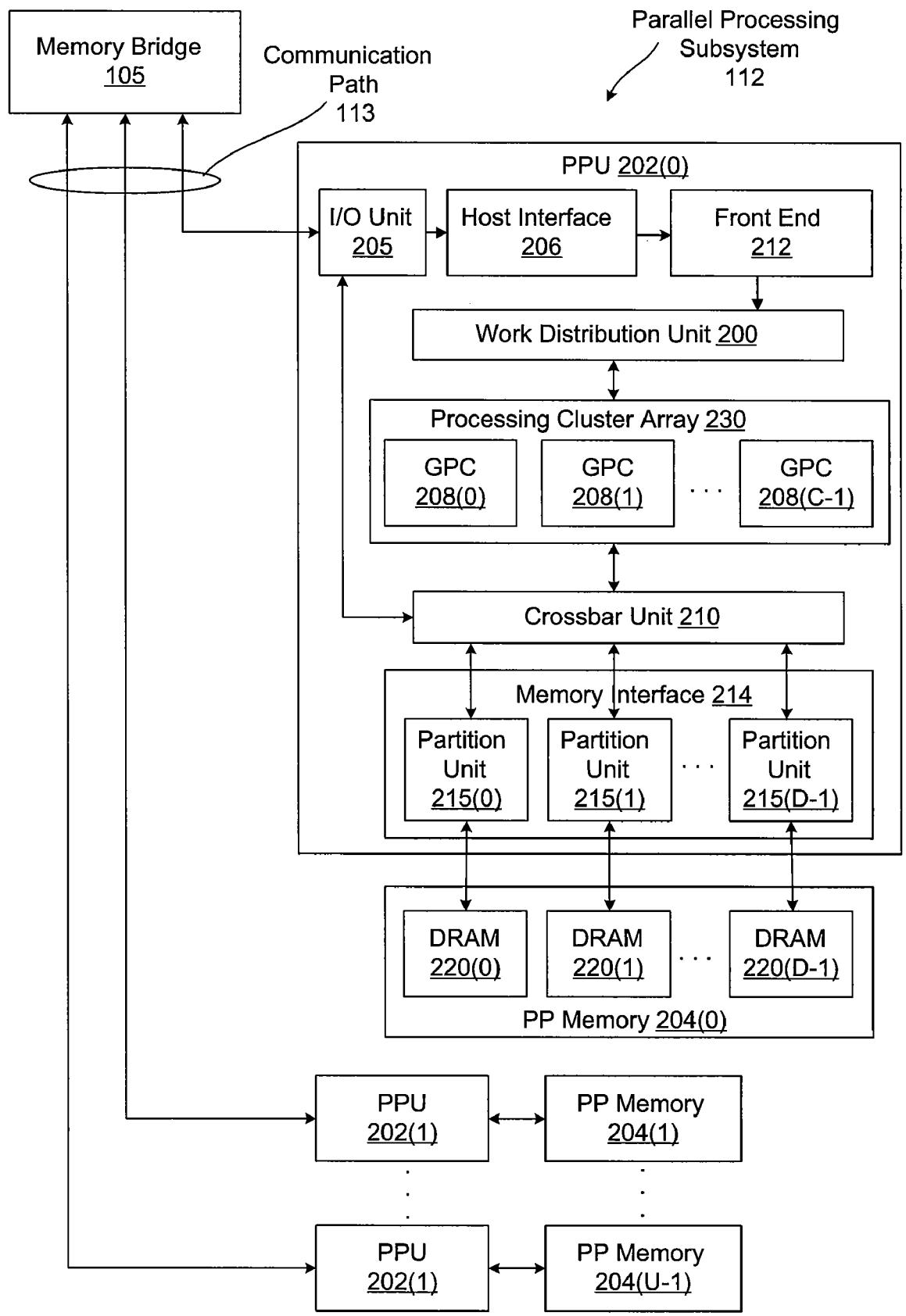
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
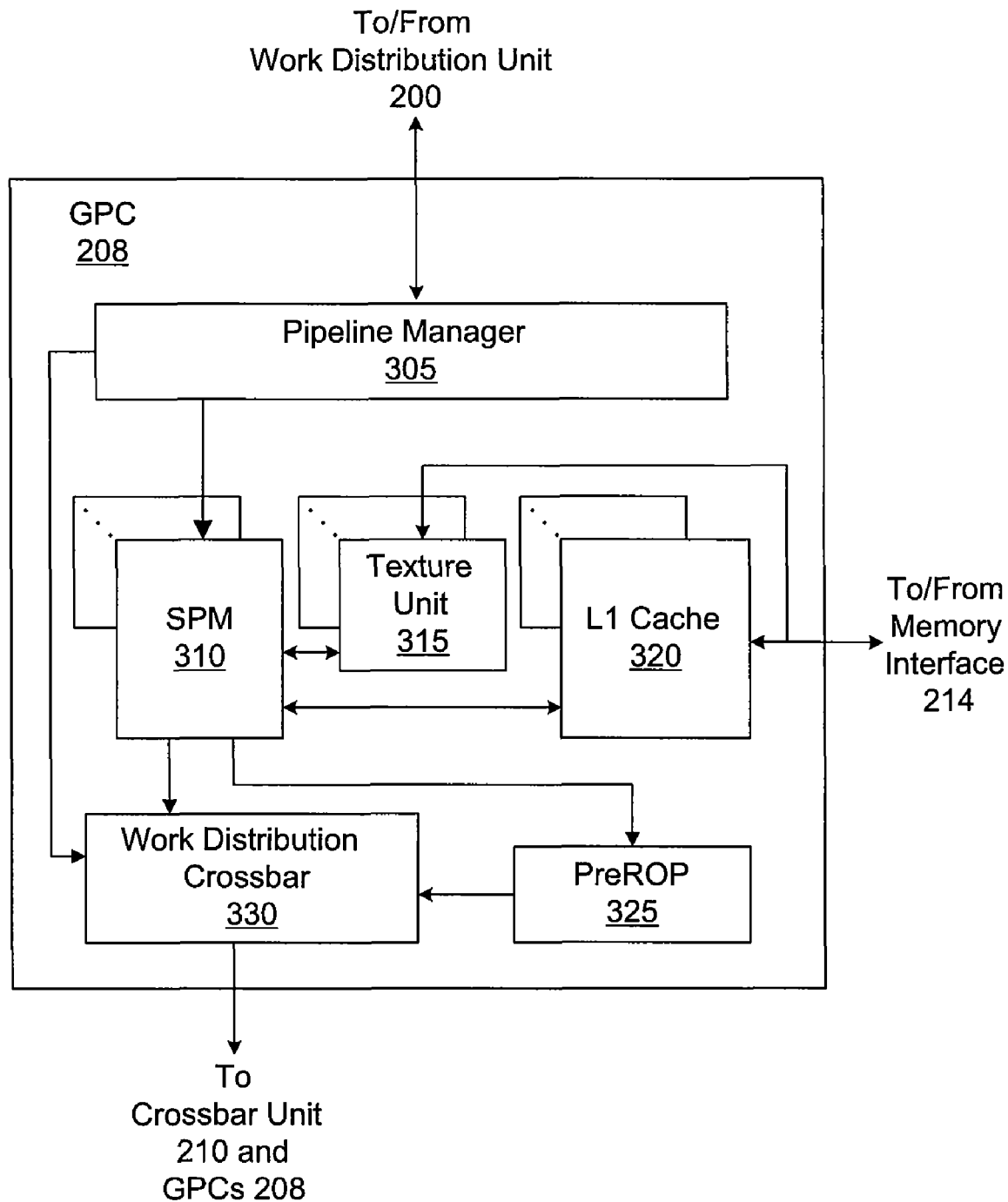
FIG. 3A is a block diagram of a general processing cluster (GPC) within one of the parallel processing units (PPUs) of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $M \geq 1$, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
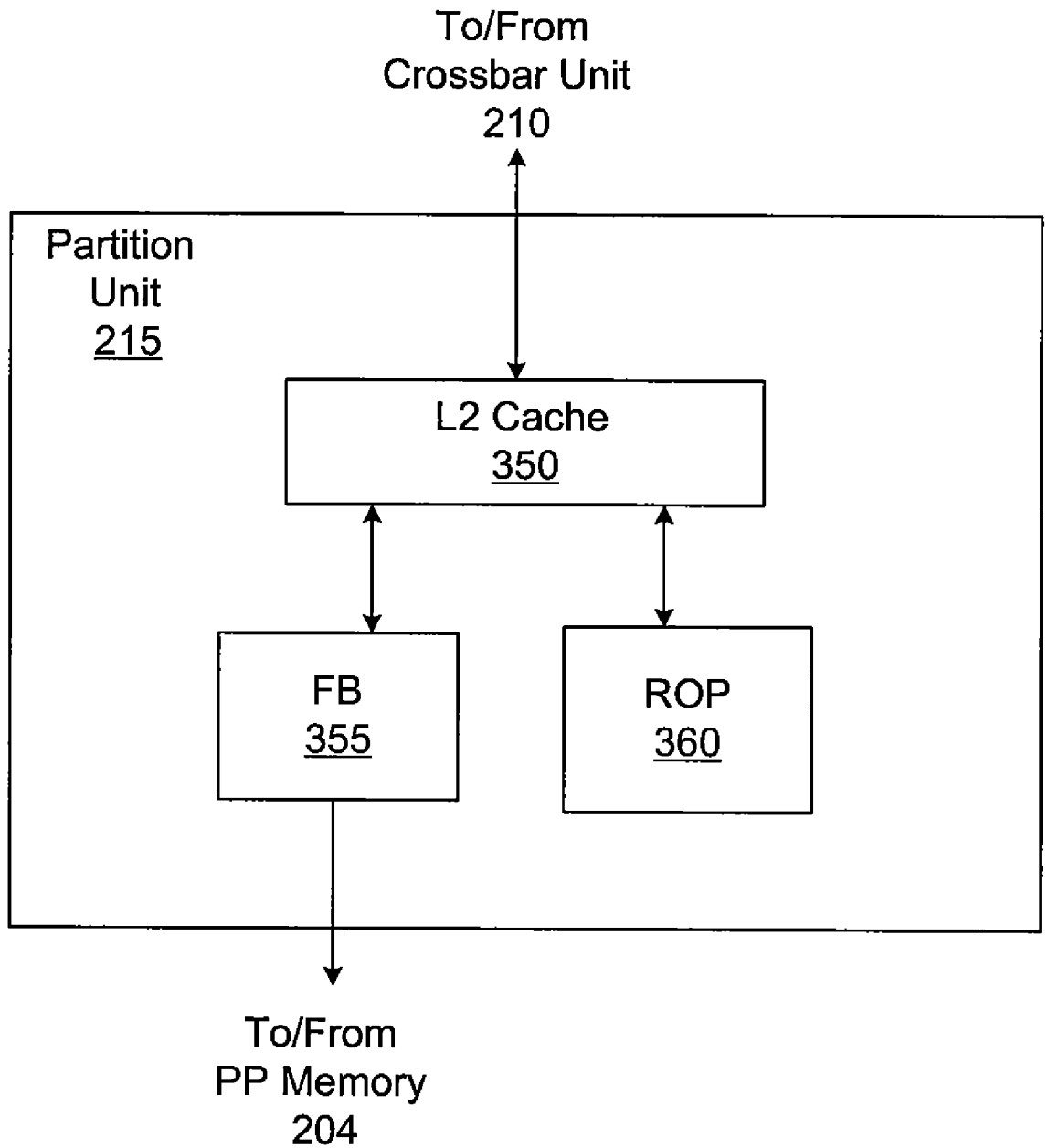
FIG. 3B is a block diagram of a partition unit within one of the PPUs of FIG. 2, according to one embodiment of the invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4A:
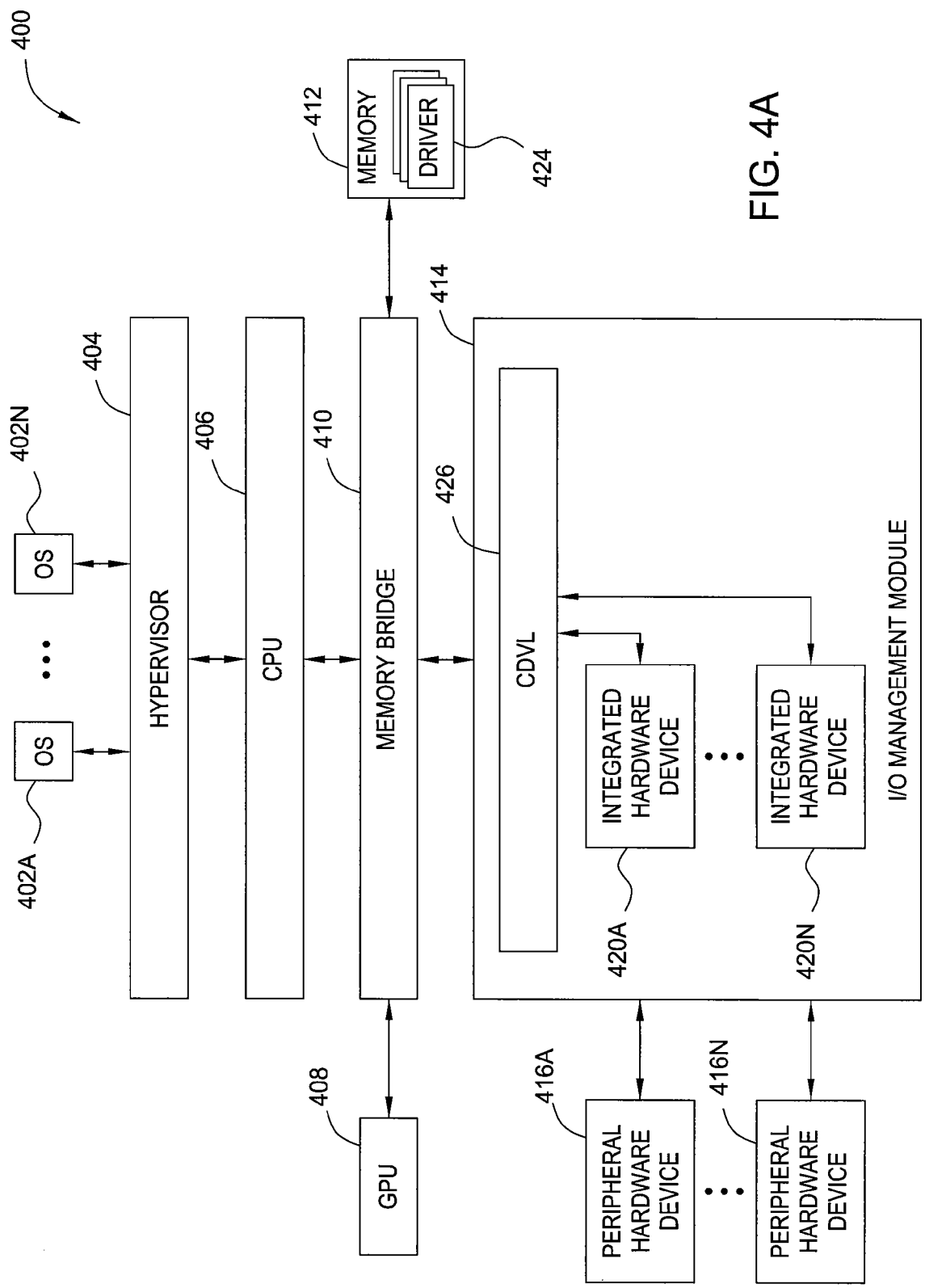
FIG. 4A-4B are conceptual diagrams of a computer system configured to implement a centralized device virtualization layer (CDVL), according to various embodiments of the invention.

FIG. 4A is a conceptual diagram of a computer system 400 configured to implement a centralized device virtualization layer (CDVL), according to one embodiment of the invention. As shown, the computer system 400 includes a plurality of operating systems (OSs) 402A-402N, a hypervisor 404, a central processing unit (CPU) 406, a graphics processing unit (GPU) 408, a memory bridge 410, a memory 412, an input/output (I/O) management module 414, and peripheral hardware devices 416A-416N. The I/O management module 414 is coupled to the peripheral hardware devices 416A-416N and includes a centralized device virtualization layer (CDVL) 426 and integrated hardware devices 420A-420N. The CPU 406, the GPU 408, the peripheral hardware devices 416A-416N and the integrated hardware devices 420A-420N are each associated with one or more drivers 424 stored in memory 414. The drivers 424 are software programs that, when executed by either the CPU 406 or the GPU 408, translate program instructions into different types of machine code. For example, the CPU 406 could execute the driver 424 associated with the GPU 408 to translate program instructions into machine code native to the GPU 408.

The CPU 406 is the primary processor of the computer system 400 and is configured execute software programs to implement the various functions of the computer system 400. These software programs include the OSs 402A-402N, the hypervisor 404, and the drivers 424. The OSs 402A-402N provide a user with different computing environments that may be used to execute applications associated with each computing environment. For example, OS 402A could be Windows® XP, an operating system that would provide the user with access to programs such as Microsoft® Office, while OS 402B could be a UNIX-based operating system that functions as a file transfer protocol (FTP) server. The hypervisor 404 is configured to coordinate the operations of the different OSs 402A-402N to avoid conflicts, as described in greater detail below. The drivers 424 may allow the OSs 402A-402N and applications executing on the OSs 402A-402N to access various functions of the CPU 406. The OSs 402A-402N, the hypervisor 404 and the drivers 424 may be stored in memory 412, or, alternatively, may be stored in an external memory unit (not shown).

The GPU 408 is a co-processor that performs graphics processing operations to supplement the processing power of the CPU 406. The GPU 408 may execute software programs that configure various hardware components (not shown) within the GPU 408 to perform different processing tasks. The GPU 408 may process graphics data using the configured hardware components. Software programs accessible to the GPU 408 such as the drivers 424 may be stored in memory 412, or, alternatively, may be stored in an external memory unit.

The CPU 406 and the GPU 408 are coupled to the memory bridge 410. In one embodiment, the memory bridge 410 is a Northbridge chip. The memory bridge 410 is coupled to the memory 412. The CPU 406 and the GPU 408 may read data from and write data to the memory 412 through the memory bridge 412. This data may include software programs as well as other types of data, such as graphics data.

The memory bridge 410 is coupled to the I/O management module 414. The I/O management module 414 allows the peripheral hardware devices 416A-416N and the integrated hardware devices 420A-420N to be accessible to the CPU 406, the GPU 408, and software programs executed by these processing units. In one embodiment, the I/O management module 414 is a Southbridge chip. The peripheral hardware devices 416A-416N may be coupled to the I/O management module 414 using a connector such as, for example, a universal serial bus (USB) connector or a firewire connector. The peripheral devices 416A-416N include a keyboard, a mouse, a printer, a scanner, a disk drive, a flash drive, a tape drive, a microphone, a speaker, a computer monitor, a digital video camera, or another computer system, among others.

The integrated hardware devices 420A-420N are located on the same chip that stores the I/O management module 414 and provides various system functions to the computer system 400. The integrated hardware devices 420A-420N include a real-time clock, an advanced power management (APM) module, a peripheral component interface (PCI) bus, a PCI express (PCIe) bus, a direct memory access (DMA) controller, an interrupt controller, a baseboard management controller, a peripheral advanced technology attachment (PATA) controller, a serial advanced technology attachment (SATA) controller, or a nonvolatile basic input/output system (BIOS) memory, among others.

The peripheral hardware devices 416A-416N and the integrated hardware devices 420A-420N, referred to collectively herein as "hardware devices," are accessible to the OSs 402A-402N via the memory bridge 410 and the I/O management module 414. The computer system 400 may implement software (SW) virtualization and/or hardware (HW) virtualization to allow the OSs 402A-402N to access the hardware devices.

Figure 4B:
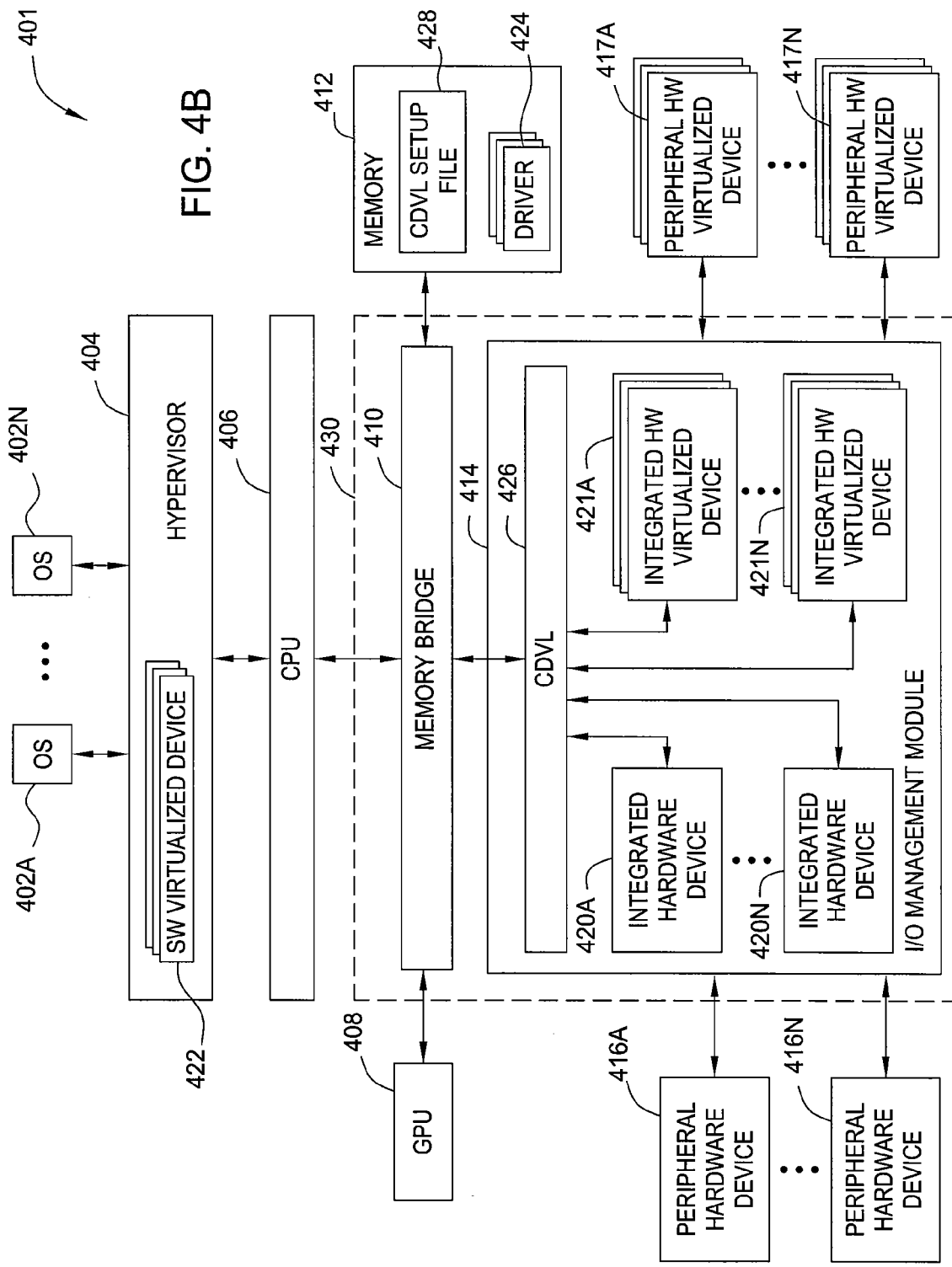

FIG. 4B is a conceptual diagram of a computer system 401 configured to implement a CDVL 426, according to one embodiment of the invention. As shown, the computer system 401 includes many of the same components as computer system 400, described in FIG. 4A. Computer system 402 additionally includes peripheral HW virtualized devices 417A-417N and integrated HW virtualized devices 421A-421N. When SW virtualization is implemented for a particular hardware device, the hypervisor 404 divides the resources associated with the hardware device into several portions to generate a SW virtualized device 422, included within the hypervisor 404. Each portion of the SW virtualized device 422 represents a fraction of the resources provided by the hardware device being virtualized. The hypervisor 404 may then allocate a different portion of the SW virtualized device 422 to each of the OSs 402A-402N.

A hardware device may implement HW virtualization by advertising multiple instances of that hardware device. The peripheral hardware devices 416A-416N and/or the integrated hardware devices 420A-420N may implement HW virtualization. Each peripheral hardware device that is virtualized is represented as a set of peripheral HW virtualized devices 417A-417N. Each integrated hardware device that is virtualized is represented as a set of integrated HW virtualized devices 421A-421N.

The sets of peripheral HW virtualized devices 417A-417N and the sets of integrated HW virtualized devices 421A-421N, collectively referred to as "HW virtualized devices," each represent multiple instances of a single hardware device being virtualized. The hypervisor 404 may allocate a different instance of the hardware device being virtualized to each of the OSs 402A-402N. When different OSs access each of the HW virtualized devices, the hardware device being virtualized resolves conflicts between the OSs before allowing the operation to continue.

The peripheral hardware devices 416A-416N, the peripheral HW virtualized devices 417A-417N, the integrated hardware devices 420A-420N, the integrated HW virtualized devices 421A-421N, and the SW virtualized devices 422, collectively referred to hereinafter as "enumerated devices," provide a wide spectrum of supplementary functions to the computer system 401 and the OSs 402A-402N. These supplementary functions include functions associated with each hardware device, such as printing, recording sound data, receiving position input from a mouse, and other functions. The OSs 402A-402N access these functions by submitting access requests to the enumerated devices. The access requests specify different access operations to be performed with the enumerated devices. Access operations include configuration operations or memory-mapped I/O (MMIO) operations. A configuration operation configures the enumerated device for a particular task. A MMIO operation performs I/O operations with a specified address space of the enumerated device.

Access requests transmitted by the OSs 402A-402N, and the corresponding access operations, are managed by the CDVL 426. The CDVL 426 is a functional unit configured to arbitrate amongst the OSs 402A-402N and to allow the OSs 402A-402N to perform access operations with the enumerated devices. The CDVL 426 intercepts access requests transmitted by the OSs 402A-402N. The CDVL 426 allocates resources provided by the enumerated devices to the OSs 402A-402N and functions to avoid conflicts between OSs that access the enumerated devices. The CDVL 426 also intercepts interrupts transmitted by each enumerated device and routes the interrupts to the OS.

When HW virtualization is implemented for a particular hardware device, the CDVL 426 coordinates access operations between OSs and each instance of the HW virtualized device. The hardware device being virtualized then allocates the physical resource to avoid conflicts between the OSs. When SW virtualization is implemented for a particular hardware device, the hypervisor 404 intercepts access requests made by the OSs 402A-402N to the SW virtualized device 422. The hypervisor 404 transmits the access requests to the CDVL 426. The CDVL 426 then coordinates access operations with the hardware device being SW virtualized.

In one embodiment, the CDVL 426 is implemented as a hardware unit located within the I/O management module 414. In another embodiment, the CDVL 426 is implemented as a combination of hardware and a micro-controller. In yet another embodiment, the CDVL 426 is implemented as a software program stored in a memory associated with the I/O management module 414 and executed by a microcontroller included in the I/O management module 414. A CDVL setup file 428 which may be located in the memory 412, in an external memory unit, or in the I/O management module 414 causes the software-implemented CDVL 426 to be stored in the I/O management module 414.

In yet another embodiment, the memory bridge 410 and the I/O management module 414 are integrated onto a single chip residing within boundary 430 and the CDVL 426 allows the OSs 402A-402N to perform access operations with the memory 412 and the GPU 408. In a further embodiment, the memory bridge 410 and the I/O management module 414 are separate chips and the OSs 402A-402N may only access the hardware devices via the CDVL 426.

The CDVL 426 avoids conflicts between OSs 402A-402N by maintaining one or more permission lists. Each permission list comprises a look-up table that indicates which enumerated devices a particular OS is permitted to access. The CDVL 426 permits access to these enumerated devices based on the permission list associated with the OS. In one embodiment, the permission lists are generated by the CDVL 426 so that only one OS is permitted to access a particular enumerated device at a particular time, thus avoiding potential conflicts.

The CDVL 426 also generates virtual address maps (VAMs) that map the address space of each enumerated device into the address space of the OSs that are permitted to use the enumerated device. The VAMs allow the access requests to be routed to the appropriate address associated with the enumerated device and also allow access operations to be performed within the relevant address space of the enumerated device.

In addition, the CDVL 426 generates interrupt maps. The CDVL 426 uses the interrupt maps to route interrupts that may be transmitted from an enumerated device to the OSs that are permitted to use the enumerated device.

The CDVL 426 is activated during start-up of the computer system 400. The CDVL 426 identifies the OSs 402A-402N and enumerates the hardware devices and the virtualized devices. The CDVL 426 also generates permission lists and, as mentioned above, may generate the VAMs and/or the interrupt maps. Once the CDVL 426 is initiated, the OSs 402A-402N may access the enumerated devices.

The VAMs and the interrupt maps may be generated during device enumeration or, alternatively, may be generated dynamically when the permissions list is updated. For example, if an OS acquires permission to use an enumerated device during operation of the computer system 400, then the CDVL 426 may dynamically generate a VAM and an interrupt map associated with the OS-enumerated device pairing.

When an OS transmits an access request to one of the enumerated devices, the OS includes a tag within the access request that identifies the OS. When the CDVL 426 intercepts the access request, the CDVL 426 examines the tag and determines whether the OS is permitted to access the enumerated device by determining whether the OS is included on a permission list associated with the enumerated device. If the OS is not permitted to use the enumerated device, then the CDVL 426 notifies the hypervisor 404. The hypervisor 404 may then take appropriate action to deny the access operation.

If the OS is permitted to use the enumerated device, then the CDVL 426 examines the VAM that maps the address space of the enumerated device into the address space of the OS. The CDVL 426 parses the access request and extracts information that specifies the range of addresses requested by the OS. The CDVL 426 determines whether the requested addresses are mapped or unmapped. If one or more of the requested addresses are unmapped, then the CDVL 426 generates a new address map that includes the requested addresses. The CDVL 426 then loads a context into the enumerated device that allows the enumerated device to perform the access operation specified by the access request. The enumerated device may then claim the access request and perform the requested access operation.

When the OS performs access operations with the enumerated device, the enumerated device may issue interrupts. The CDVL 426 intercepts these interrupts and uses the interrupt maps to transmit the interrupts to the correct address within the address space of the OS. The OS may then take appropriate steps to process the interrupts. These steps may include transmitting additional access requests to the enumerated device via the CDVL 426.

During operation of the computer system 401, additional hardware devices may be attached to the I/O management module 414. When an additional hardware device is attached to the I/O management module 414, the CDVL 426 enumerates the additional hardware device and determines which of the OSs 402A-402N are permitted to use the additional hardware device. The CDVL 426 may then generate additional VAMs and additional interrupt maps so that the OSs 402A-402N may access the resources provided by the additional hardware device.

The CDVL 426 is also configured to allow additional CPUs to be attached to the memory bridge 410 during operation of the computer system 401. The additional CPUs may execute multiple OSs. Each CPU may execute a different hypervisor to manage the OSs executed by that CPU. This configuration is described below in FIG. 5.

Figure 5:
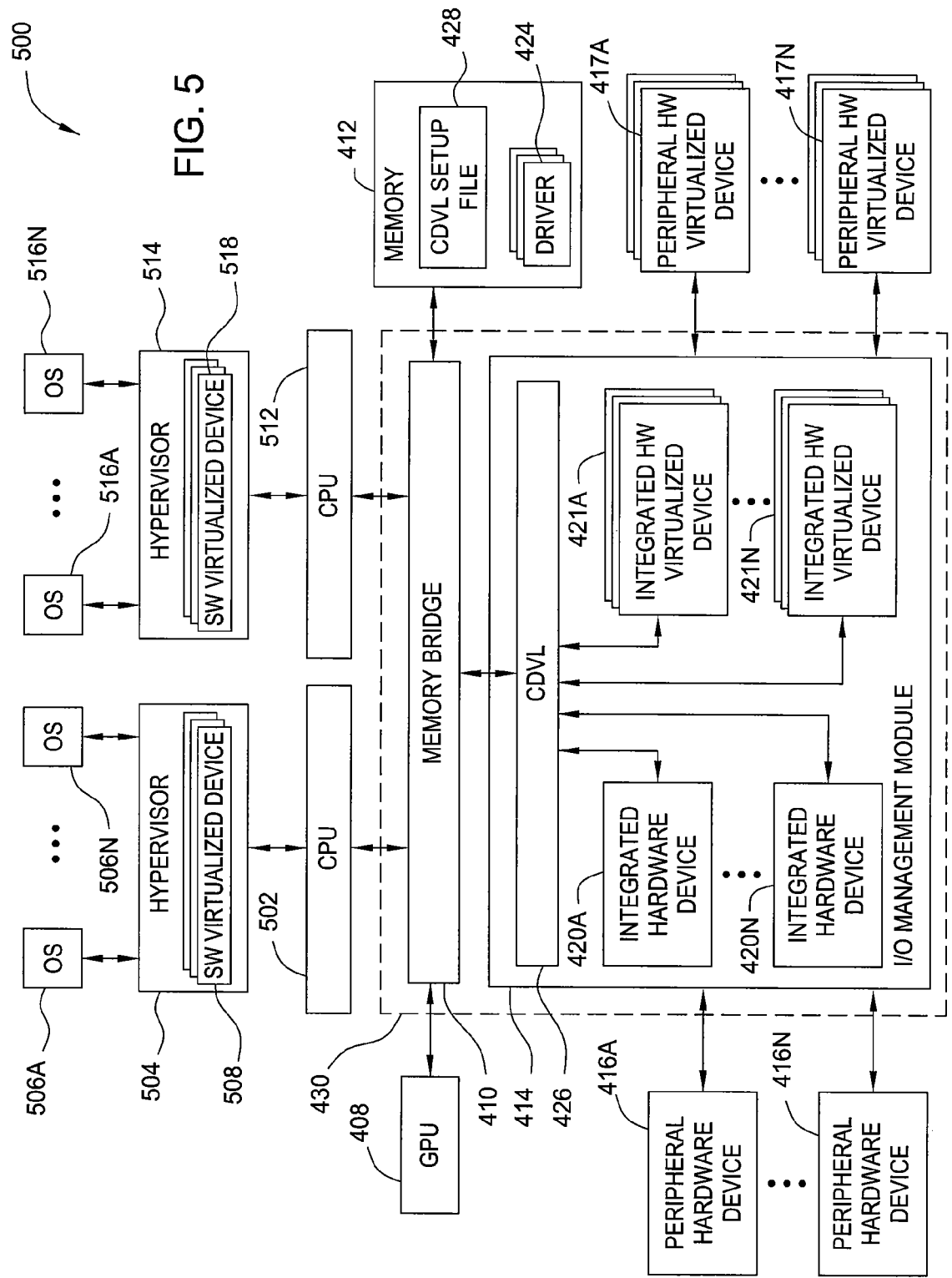
FIG. 5 is a conceptual diagram of a multi-processor computer system configured to implement a CDVL, according to one embodiment of the invention.

FIG. 5 is a conceptual diagram of a multi-processor computer system 500 configured to implement a CDVL 426, according to one embodiment of the invention. As shown, the multi-processor computer system 500 includes a many of the same components as the computer system 401, described in FIG. 4B.

In addition, the multi-processor computer system 500 includes a CPU 502, a hypervisor 504, OSs 506A-506N, a CPU 512, a hypervisor 514, and OSs 516A-516N. The CPU 502 and the CPU 512 are parallel processing units similar to the CPU 406, described in FIG. 4B. The CPU 502 and the CPU 512 may execute software programs to implement the functionality of the multi-processor computer system 500. For example, the CPU 502 and the CPU 512 may each execute one or more of the drivers 424 that, when executed, may translate program instructions into machine code native to the CPU 502 and the CPU 512, respectively.

The CPU 502 executes software programs including the hypervisor 504 and the OSs 506A-506N. The hypervisor 504 is substantially similar to the hypervisor 404, and the OSs 506A-506N are substantially similar to the OSs 402A-402N. The hypervisor 504 is configured to manage the operations of the OSs 506A-506N. The OSs 506A-506N are configured to access the hardware devices via the memory bridge 410 and the I/O management module 414. When one or more of the hardware devices is SW virtualized, the hypervisor 504 includes one or more sets of SW virtualized devices 508 that are accessible by the OSs 506A-506N.

The CPU 502 may execute software programs including the hypervisor 514 and the OSs 516A-516N. The hypervisor 514 is substantially similar to the hypervisor 504 and the OSs 516A-516N are substantially similar to the OSs 506A-506N. The hypervisor 514 is configured to manage the operations of the OSs 516A-516N and may include one or more sets of SW virtualized devices 518 when one or more of the hardware devices is SW virtualized.

The OSs 506A-506N and the OSs 516A-516N may access the hardware devices by transmitting access requests through the hypervisor 508 and the hypervisor 518, respectively. The hypervisor 508 and the hypervisor 518 route these access requests to the CDVL 426. The CDVL 426 operates in substantially the same way as described above in FIG. 4B. Accordingly, the CDVL 426 maintains permissions lists that describe which hardware devices the OSs 506A-506N and/or OSs 516A-516N are permitted to access. The CDVL 426 also maintains VAMs and interrupt maps for the hardware devices and the OSs 506A-506N and/or the OSs 516A-516N that are permitted to use those hardware devices.

Figure 6:
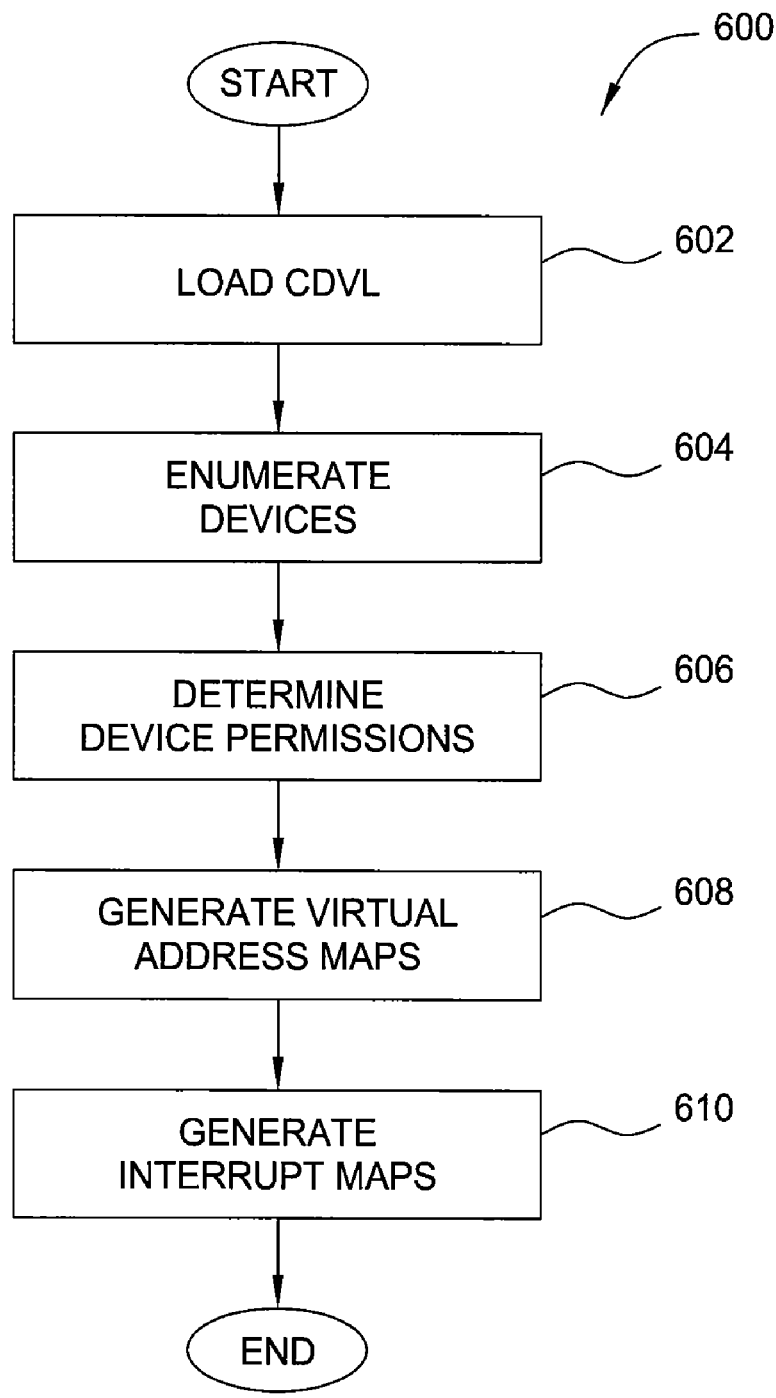
FIG. 6 is a flowchart of method steps for initiating a CDVL on a computer system, according to one embodiment of the invention.

FIG. 6 is a flowchart of method steps for initiating a CDVL 426 on a computer system, according to one embodiment of the invention. Persons skilled in the art will understand that, even though the method 600 is described in conjunction with the systems of FIGS. 1-5, any system configured to perform the method steps, in any order, is within the scope of the invention.

As shown, the method 600 begins at step 602, where the CDVL 426 is loaded. When the CDVL 426 is implemented as a hardware unit included within the I/O management module 414, loading the CDVL 426 comprises powering-on the CDVL 426. When the CDVL 426 is implemented as a software program, loading the CDVL 426 comprises the CDVL setup file 428 causing the CDVL 426 to be stored in a memory unit associated with the I/O management module 414. The software-implemented CDVL 426 is executed by a processor included in the computer system or a microcontroller included in the I/O management module 414.

At step 604, the CDVL 426 enumerates the hardware devices and the virtualized devices by generating an device list that identifies each of the hardware devices and each of the virtualized devices. The CDVL 426 may also include properties associated with each hardware device and each virtualized device in the device list. Additionally, the CDVL 426 may examine each of the hardware devices and the virtualized devices to determine the range of addresses that may be used to access each of these devices. This information may be included in the device list.

At step 606, the CDVL 426 generates permission lists that specify which of the OSs 506A-506N and/or OSs 516A-516N are permitted to access each hardware device and each virtualized device. In one embodiment, the permission lists are generated so that different OSs are prevented from simultaneously performing access operations with the same enumerated device.

At step 608, the CDVL 426 generates VAMs that map the address space of each hardware device and each virtualized device into the address space of the OSs that are permitted to use that enumerated device. A step 610, the CDVL 426 generates interrupt maps that may be used to route the interrupts of each enumerated device into the address space of the OSs that are permitted to use that enumerated device.

Figure 7:
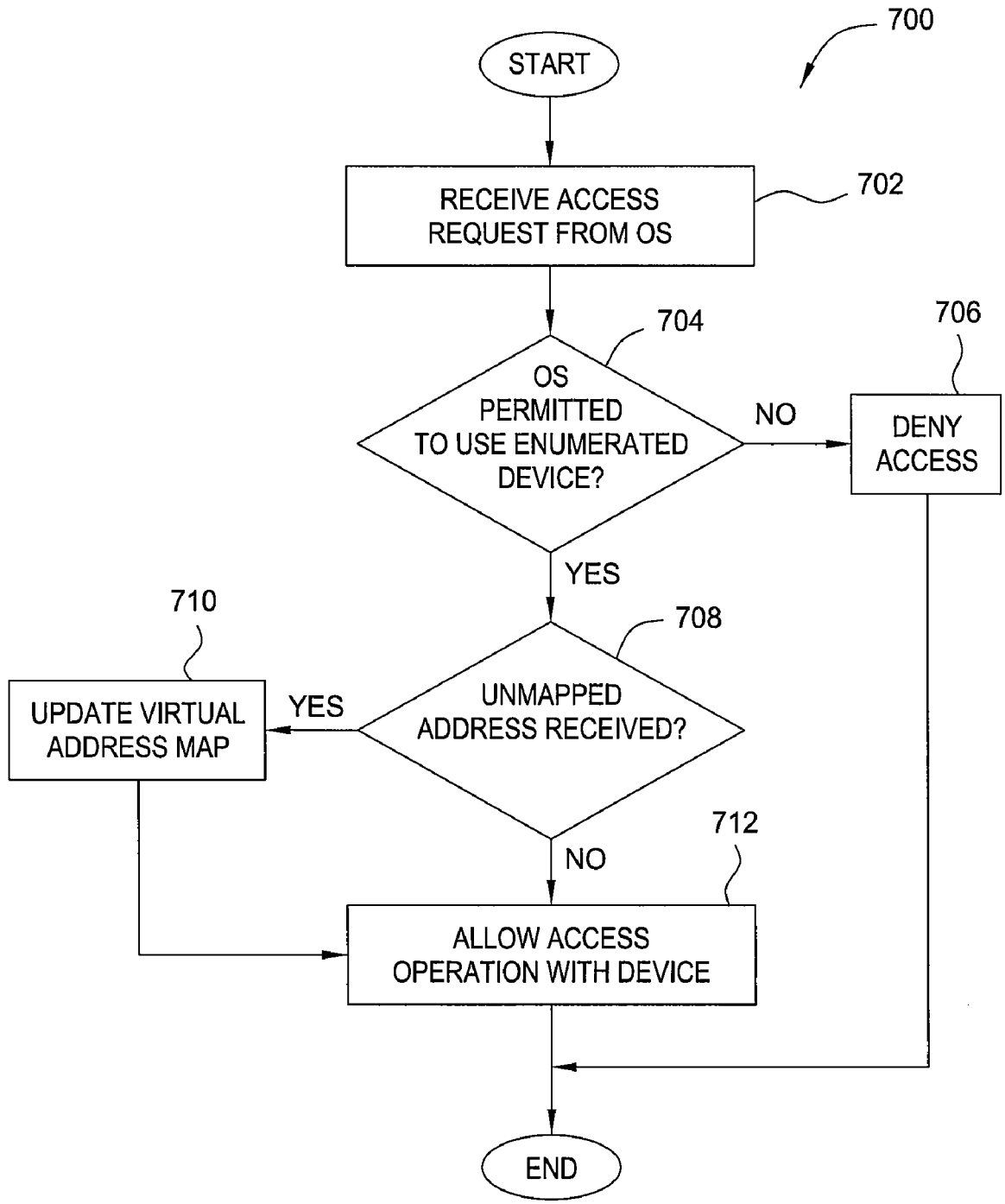
FIG. 7 is a flowchart of method steps for implementing a CDVL on a computer system, according to one embodiment of the invention.

FIG. 7 is a flowchart of method steps for implementing the CDVL 426 on a computer system, according to one embodiment of the invention. Persons skilled in the art will understand that, even though the method 700 is described in conjunction with the systems of FIGS. 1-5, any system configured to perform the method steps, in any order, is within the scope of the invention.

As shown, the method 700 begins at step 702, where the CDVL 426 receives an access request from an OS. The OS could be, for example, one of the OSs 402A-402N, one of the OSs 506A-506N, or one of the OSs 516A-516N. The access request includes a tag that identifies the OS. The access request also includes the enumerated device that the OS wishes to access, the access operation that the OS wishes to perform, and the addresses that the OS wishes to access.

At step 704, the CDVL 426 determines whether the OS is permitted to access the enumerated device specified in the access request. The CDVL 426 examines the tag associated with the access request to determine the OS from which the access request is received. The CDVL 426 also examines the access request to determine which enumerated device is requested. The CDVL 426 then accesses a permission list associated with the requested enumerated device. The permission list specifies the OSs that are permitted to use that enumerated device, as described above. The CDVL 426 determines whether the OS is included in the permission list and, thus, whether the OS is permitted to access the requested enumerated device.

If the OS is not included on the permission list, then the OS is not permitted to access that enumerated device, and the method advances to step 706. At step 706, the CDVL 426 denies the OS access to the enumerated device, and the method 700 terminates.

If the OS is included on the permission list, then the method 700 advances to step 708. At step 708, the CDVL 426 determines whether an unmapped address is included in the access request. The CDVL 426 examines the access request to determine the addresses the OS intends to access. The CDVL 426 also accesses the VAM associated with the OS and the enumerated device. The CDVL 426 compares the addresses included in the access request to the VAM and determines whether any of the specified addresses are not included in the VAM, which indicates that these addresses are unmapped.

If the access request does not includes unmapped addresses (i.e., all of the addresses specified in the access request are included in the VAM), then the method 700 advances to step 712.

If any addresses specified in the access request are unmapped, then the method 700 advances to step 710. At step 710, the CDVL 426 updates the VAM by mapping the unmapped addresses into the address space of the enumerated device. The method 700 then advances to step 712.

At step 712, the CDVL 426 allows the requested access operation to continue with the requested enumerated device. The CDVL 426 coordinates the access operations by routing configuration operations and MMIO operations that may be transmitted by the OS to the appropriate addresses within the address space of the enumerated device using the VAM. The CDVL also routes interrupts generated by the enumerated device to the appropriate addresses within the address space of the OS using the interrupt maps. When the access operation is complete, the method 700 terminates.

In sum, a centralized device virtualization layer (CDVL) supports device virtualization for operating systems (OSs) that execute on different central processing units (CPUs) in a multi-CPU computer system. The CDVL operates from within an input/output (I/O) management module, such as a Southbridge (SB) chip, that connects the different CPUs with one or more enumerated devices. Enumerated devices include hardware devices and virtualized devices. The CDVL keeps track of which OSs are permitted to use each enumerated device by generating a permission list for each enumerated device that includes the OSs that may access that enumerated device. When an OS is permitted to use an enumerated device, the OS may perform access operations with the enumerated device, which may include configuration operations and/or memory-mapped I/O operations.

When an OS attempts to access the resources provided by a particular enumerated device, the OS generates an access request that includes a tag identifying the OS. The OS then transmits the access request to the CDVL via the hypervisor that manages the OS. The CDVL examines the tag associated with the access request to determine whether the OS is permitted to access the enumerated device. If an OS attempts to access an enumerated device that the OS is not permitted to use, then the CDVL notifies the hypervisor associated with the OS. The hypervisor may then take appropriate steps to deny the OS access to the enumerated device.

The CDVL routes configuration operations and/or MMIO operations to enumerated devices using virtual address maps (VAMs). The VAMs provide a mapping of the address space of each enumerated device into the address spaces of the OSs that are permitted to access that enumerated device. The CDVL may generate the VAMs during device enumeration or during runtime.

When an OS transmits an access request to the CDVL, and the CDVL grants the access request, the CDVL then examines the relevant VAM to ensure that the requested address has been mapped. If the requested address is unmapped, then the CDVL may generate a new VAM. The CDVL routes the access request to the correct address on the enumerated device using the VAM. The CDVL may also perform other actions that allow the access to continue, such as context switching or device quiescing.

The CDVL handles enumerated device interrupts by mapping the interrupts from a particular enumerated device into the OSs that may access the enumerated device. If the enumerated device issues an interrupt, then the CDVL may transmit the interrupt to the relevant address within the OS address space through the hypervisor that manages the OS. The CDVL may generate the interrupt map during device enumeration or when enumerated device permissions change.

Advantageously, the CDVL extends device virtualization to computing systems that include multiple CPUs. The CDVL allows OSs executing on each CPU to access a common pool of enumerated devices that are coupled to the computing system. The CDVL may be used in conjunction with SW virtualization and HW virtualization to provide dedicated virtualization support to an OS that requires such support. Another advantage of the CDVL is that additional CPUs may be added to the computing system by coupling the additional CPUs to the memory bridge. When the additional CPUs each execute one or more OSs, each of the OSs executing on CPUs coupled to the memory bridge may access the enumerated devices via the CDVL.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for providing an operating system access to hardware devices included in a computer system, comprising:
enumerating one or more hardware devices and one or more virtualized devices included in the computer system, including:
determining that resources associated with a first hardware device are divided into guest physical resources thereby creating a software (SW) virtualized device, and
determining that multiple instances of resources associated with a second hardware device are advertised by the second hardware device thereby creating a hardware (HW) virtualized device;
generating a first permission list that specifies which operating systems in a plurality of operating systems are permitted to access the SW virtualized device;
generating a second permission list that specifies which operating systems in the plurality of operating systems are permitted to access the HW virtualized device;
generating a first set of virtual address maps that each map a first address space associated with the SW virtualized device into an address space associated with each operating system included in the first permission list;
generating a second set of virtual address maps that each map a second address space associated with the HW virtualized device into an address space associated with each operating system included in the second permission list; and
arbitrating access requests from each of the plurality of operating systems, including:
allowing the operating systems included in the first permission list to perform access operations using the SW virtualized device based on the first set of virtual address maps, and
allowing the operating systems included in the second permission list to perform access operations using the HW virtualized device based on the second set of virtual address maps.

2. The method of claim 1, further comprising the step of receiving an access request from a first operating system in the plurality of operating systems that includes information specifying a first hardware device or a first virtualized device that the first operating system intends to access, and information specifying access operations that the first operating system intends to execute on the first hardware device or a hardware device associated with the first virtualized device.

3. The method of claim 2, wherein the first virtualized device comprises the SW virtualized device.

4. The method of claim 3, further comprising the step of determining that the first operating system is included in the first permission list.

5. The method of claim 4, further comprising the step of allowing the first operating system to perform the access operations using the SW virtualized device.

6. The method of claim 5, wherein the access operations include configuration operations and memory-mapped input/output (MMIO) operations routed from the first operating system to the SW virtualized device using the first set of virtual address maps.

7. The method of claim 2, wherein the first virtualized device comprises the HW virtualized device.

8. The method of claim 7, further comprising the step of determining that the first operating system is included in the second permission list.

9. The method of claim 8, further comprising the step of allowing the first operating system to perform the access operations using the HW virtualized device.

10. The method of claim 9, wherein the access operations include configuration operations and memory-mapped input/output (MMIO) operations routed from the first operating system to the HW virtualized device using the second set of virtual address maps.

11. A non-transitory computer-readable medium storing instructions that, when executed by a processor, cause a computing device to provide an operating system access to hardware devices included in a computer system, comprising:
enumerating one or more hardware devices and one or more virtualized devices included in the computer system, including:
determining that resources associated with a first hardware device are divided into guest physical resources thereby creating a software (SW) virtualized device, and
determining that multiple instances of resources associated with a second hardware device are advertised by the second hardware device thereby creating a hardware (HW) virtualized device;

generating a first permission list that specifies which operating systems in a plurality of operating systems are permitted to access the SW virtualized device;

generating a second permission list that specifies which operating systems in the plurality of operating systems are permitted to access the HW virtualized device;

generating a first set of virtual address maps that each map a first address space associated with the SW virtualized device into an address space associated with each operating system included in the first permission list;

generating a second set of virtual address maps that each map a second address space associated with the HW virtualized device into an address space associated with each operating system included in the second permission list; and arbitrating access requests from each of the plurality of operating systems, including:
  allowing the operating systems included in the first permission list to perform access operations using the SW virtualized device based on the first set of virtual address maps, and
  allowing the operating systems included in the second permission list to perform access operations using the HW virtualized device based on the second set of virtual address maps.

12. The non-transitory computer-readable medium of claim 11, further comprising the step of receiving an access request from a first operating system in the plurality of operating systems that includes information specifying a first hardware device or a first virtualized device that the first operating system intends to access, and information specifying access operations that the first operating system intends to execute on the first hardware device or a hardware device associated with the first virtualized device.

13. The non-transitory computer-readable medium of claim 12, wherein the first virtualized device comprises the SW virtualized device, and further comprising the steps of:
  determining that the first operating system is included in the first permission list; and
  allowing the first operating system to perform the access operations using the SW virtualized device, wherein the access operations include configuration operations and memory-mapped input/output (MMIO) operations routed from the first operating system to the SW virtualized device using the first set of virtual address maps.

14. The non-transitory computer-readable medium of claim 12, wherein the first virtualized device comprises the HW virtualized device, and further comprising the steps of:
  determining that the first operating system is included in the second permission list; and
  allowing the first operating system to perform the access operations using the HW virtualized device, wherein the access operations include configuration operations and memory-mapped input/output (MMIO) operations routed from the first operating system to the HW virtualized device using the second set of virtual address maps.

15. A computing device, comprising:
a first processor configured to execute a first set of operating systems;
a first hardware device;
a system memory that stores a first hypervisor executed by the first processor configured to divide resources associated with the first hardware device into guest physical resources to create a first software (SW) virtualized device; and
an input/output (I/O) management module including a memory storing instructions configured to allow the first processor to access the first SW virtualized device by performing the steps of:
  generating a first permission list that specifies which operating systems included in the first set of operating systems are permitted to access the first SW virtualized device stored in the first hypervisor,
  generating a first set of virtual address maps that each map a first address space associated with the first SW virtualized device stored in the first hypervisor into an address space associated with each of the operating systems included on the first permission list, and
  arbitrating access requests from each operating system included in the first set of operating systems by allowing the operating systems included in the first permission list to perform access operations using the first SW virtualized device based on the first set of virtual address maps.

16. The computing device of claim 15, further comprising:
a second processor configured to execute a second set of operating systems; and
a second hardware device configured to advertise multiple instances of resources associated with the second hardware device to create a hardware (HW) virtualized device,
wherein the system memory further stores a second hypervisor executed by the second processor configured to divide the resources associated with the first hardware device into guest physical resources to create a second SW virtualized device, and
wherein the memory included in the I/O management module further includes instructions configured to allow the second processor to access the second SW virtualized device by performing the steps of:
  generating a second permission list that specifies which operating systems included in the second set of operating systems are permitted to access the second SW virtualized device stored in the second hypervisor,
  generating a second set of virtual address maps that each map a second address space associated with the second SW virtualized device stored in the second hypervisor into an address space associated with each of the operating systems included on the second permission list, and
  allowing the operating systems included in the second permission list to perform access operations using the second SW virtualized device based on the second set of virtual address maps.

17. The computing device of claim 16, wherein the memory included in the I/O management module further includes instructions configured to:
  generate a third permission list that specifies which operating systems included in the first set of operating systems and the second set of operating systems are permitted to access the HW virtualized device; and
  generate a third set of virtual address maps that each map a third address space associated with the HW virtualized device into an address space associated with each of the operating systems included on the third permission list.

18. The computing device of claim 17, wherein the memory included in the I/O management module further includes instructions configured to receive an access request from a first operating system included in the first set of operating systems that includes information specifying a first hardware device or a first virtualized device that the first operating system intends to access, and information specifying access operations that the first operating system intends to execute on the first hardware device or a hardware device associated with the first virtualized device.

19. The computing device of claim 18, wherein the first virtualized device comprises the first SW virtualized device, and the memory included in the I/O management module further includes instructions configured to:
- determine that the first operating system is included in the first permission list; and
- allow the first operating system to perform the access operations using the first SW virtualized device, wherein the access operations include configuration operations and memory-mapped input/output (MMIO) operations routed from the first operating system to the first SW virtualized device using the first set of virtual address maps.

20. The computing device of claim 18, wherein the first virtualized device comprises the HW virtualized device, and the memory included in the I/O management module further includes instructions configured to:
- determine that the first operating system is included in the third permission list; and
- allow the first operating system to perform the access operations using the HW virtualized device, wherein the access operations include configuration operations and memory-mapped input/output (MMIO) operations routed from the first operating system to the HW virtualized device using the third set of virtual address maps.

* * * * *